United States Patent [19]

Dreyer et al.

[11] Patent Number: 4,637,247
[45] Date of Patent: Jan. 20, 1987

[54] METHOD OF RECOGNIZING KNOCKING SIGNALS IN A RECEIVED SIGNAL DERIVED FROM A KNOCKING SENSOR IN AN INTERNAL COMBUSTION ENGINE, AND SYSTEM CARRYING OUT THE METHOD

[75] Inventors: Adolf Dreyer, Oberriexingen; Herman Roozenbeek, Schwieberdingen, both of Fed. Rep. of Germany

[73] Assignee: Robert Bosch GmbH, Stuttgart, Fed. Rep. of Germany

[21] Appl. No.: 762,612

[22] Filed: Aug. 5, 1985

[30] Foreign Application Priority Data

Aug. 16, 1984 [DE] Fed. Rep. of Germany ....... 3430000

[51] Int. Cl.⁴ .............................................. G01L 23/22
[52] U.S. Cl. ........................................................ 73/35
[58] Field of Search .................... 73/35; 123/425, 435; 364/431.08

[56] References Cited

U.S. PATENT DOCUMENTS 4,289,102  9/1981  Katsumata et al. ............... 73/35 X
4,364,260 12/1982  Chen et al. ............................ 73/35
4,444,042  4/1984  Bonitz et al. .......................... 73/35
4,478,068 10/1984  Bonitz et al. .......................... 73/35
4,565,087  1/1986  Damson et al. ....................... 73/35

FOREIGN PATENT DOCUMENTS 1082978  3/1984  U.S.S.R. .............................. 123/425

Primary Examiner—Stephen A. Kreitman
Assistant Examiner—Scott M. Oldham
Attorney, Agent, or Firm—Frishauf, Holtz, Goodman & Woodward

[57] ABSTRACT

To reliably distinguish between knocking signals derived from an internal combustion engine knock sensor from all the other signals likewise derived from the knock sensor, which includes background noise signals, statistically distributed disturbance signals and the like, a correlation signal is generated, and the received signal is correlated with the correlation signal, which is cyclically varying at an average frequency which is of the frequency of the expected knocking signal, or a whole number multiple thereof. An output recognition is provided upon correlation between the correlation signal and the signal from the knocking sensor. The system can be implemented by a signal generator (6, 61, 62; 63) which provides the correlation signal, correlation being effected by an AND-gate (7, 71, 72; 73), or by software in a microprocessor in which an incoming knocking signal is interrogated in cadence with cyclical variation at the frequency which is the expected knocking frequency of the engine.

11 Claims, 4 Drawing Figures

METHOD OF RECOGNIZING KNOCKING SIGNALS IN A RECEIVED SIGNAL DERIVED FROM A KNOCKING SENSOR IN AN INTERNAL COMBUSTION ENGINE, AND SYSTEM CARRYING OUT THE METHOD

The present invention relates to a method to recognize knocking signals in a received signal, derived from a knocking sensor in an internal combustion engine, in which the received signal includes a mixture of background noise signals and the knocking signals, if the engine has a tendency to operate under knocking conditions or is operating under engine knocking conditions.

BACKGROUND

It is difficult to separate knocking signals which occur in the operation of an internal combustion engine from time to time—that is, if the engine is placed under knocking operating conditions—from background noise signals which tend to mask the knocking signals and which may have, at least for a short period of time, similar characteristics.

German Patent Disclosure Document No. DE-OS 33 42 466 describes a system to recognize combustion conditions resulting in knocking of the engine. The system includes a comparator and a knocking filter. The knocking filter is connected to the input of the comparator, which may be a comparison network, the other input of which is connected to a reference source. If the output of the knocking filter exceeds the reference level, then a pulse is provided, at the output of the comparison system, which is used to recognize knocking conditions of the operation of the engine.

The knocking filter, generally, is formed as a band-pass filter having a center frequency which is tuned or set to the center frequency of the knocking signal which is to be expected. The output signal of a knock sensor includes not only knocking signals—when they occur—but continuously background noise signals as well as statistically distributed disturbances, which are derived in the course of operation of the internal combustion engine, and are due to its operation. If the reference voltage for the comparison system is derived from the background noise signal—as described in numerous versions of knocking recognition systems and methods, then the statistically distributed disturbances may also lead to exceeding the reference threshold of the comparator system and thus may contribute to an erroneous recognition of operation of the engine under knocking condition. Similarly, knocking recognition circuits which have a controlled input amplification may provide erroneous output signals; in such circuits, the control of the input amplification is generally controlled by a reference voltage which is set to provide a fixed quiescent or base voltage level.

The Invention.

It is an object to improve the separation of knocking signals from the overall signal derived from a knocking sensor, so that knocking conditions of operation of the engine can be reliably recognized by reliably recognizing only knocking signals which occur in the mixture of background noise signals, knocking signals, and statistically distributed disturbance signals, and all applied to a knocking signal recognition system or apparatus.

Briefly, the received signal is correlated with a cyclically varying correlation signal having an average frequency which is a characteristic of a function of the frequency of the knocking signals occurring upon knocking operation of the internal combustion engine (ICE), the cyclically varying correlation signal being derived from the received signal. An output signal is provided if the correlation between the cyclically varying signal and the received signal is established.

The cyclically varying correlation signal may have an average frequency corresponding at least approximately to the knocking frequency of the internal combustion engine; it may respond or include, additionally, whole number multiples of the knocking frequency expected in the derived signal which, likewise, may have these harmonics; in accordance with another feature of the invention, one half of the reciprocal of the knocking frequency expected of the internal combustion engine may be selected as the average frequency of the cyclically varying correlation signal.

In accordance with a feature of the invention, a correlation filter is provided to separate disturbances and noise signals from the knocking signals. The correlation signal suppresses the first pulse, or single individually occurring pulses in the signal derived from the sensor. This permits reliable recognition of engine knocking even if the signal/noise ratio is highly unfavorable.

The system and method of the present invention has the advantage that single, and initial pulses are suppressed and that the apparatus to do so requires only inexpensive and easily derived circuitry components. Further, the method can be carried out entirely by software of a microprocessor.

Knocking signals can be recognized which have a level which is within the overall level of the noise signal. This permits reduction of the comparison threshold level of a comparator with a given reliability of recognition, that is, separation of the knocking signal from the derived signal. The system and method thus permits recognition of knocking signals of lesser intensity than previously possible, resulting in further improvement of engine operation and control thereof close to the knocking limit. The correlation filter can be constructed in form of a microcomputer which, additionally, reduces the requirements for circuit components.

DRAWINGS

DETAILED DESCRIPTION

Figure 1:
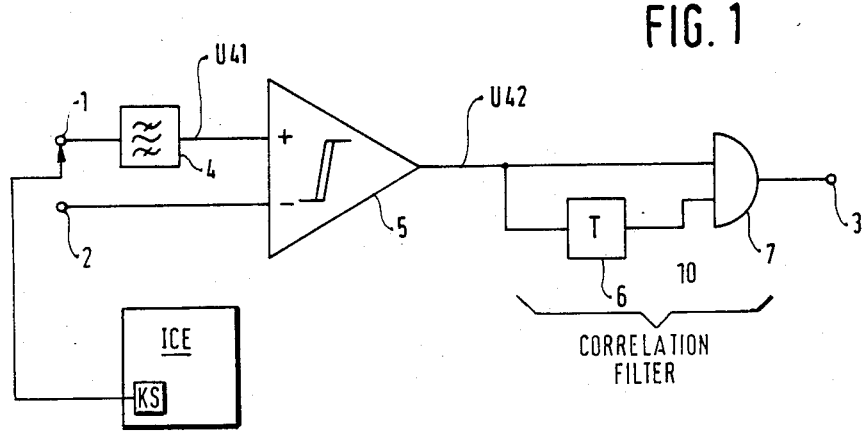
FIG. 1 is a schematic diagram illustrating a first embodiment of the invention.

An internal combustion engine ICE, which is shown only in FIG. 1 for clarity of the other drawings, has a knock sensor KS installed therein, which provides an output signal to an input terminal 1 of the system which recognizes knocking signals from all the signals provided by the knock sensor KS. The received signal at terminal 1 is conducted to a knocking filter 4 which has its output connected to the positive input of a comparator 5. The negative or inverting input is connected to a reference signal source 2, for example to a reference voltage source. The output of the comparator 5 is connected to dead-time circuit 6 functioning as a cyclically varying signal source, which provides output signals in pulse form, that is, signals which have a dead-time therebetween. The output of the circuit 6 as well as the output of the circuit 5 are connected to an AND-gate 7, the output of which is connected to an output terminal 3. The signal from filter 4 is shown at signal U41 in FIG. 3, and the signal from circuit 5 as U42 in FIG. 3.

Timing, or rather dead-time circuit 6 and the AND-gate 7 together form a correlation filter 10. The correlation filter 10 has the spectrum of a comb filter, with a base frequency which is tuned to or matched at least approximately to the center frequency of the knocking signal to be expected from the engine ICE. Such filters are well known and, for example, also known as transversal filters with constant coefficients. In the example selected, the correlation filter is one of the first order or first degree of signal; higher order correlation, and correlation filters may be used. The cyclically varying signal source dead-time circuit 6 may be physically formed by a chain of monostable multivibrators or, for example, by a clock-signal controlled shift register. The time constant T of the circuit 6 is the reciprocal of the center frequency of the knocking signal to be expected.

The filter 4 is constructed as a bandpass, having a band-pass range which is tuned to, or matched to the frequency range of the knocking signal to be expected. The filter 4 may, however, also be formed as a filter network which has a plurality of stages, each connected to the terminal 1 which forms the output terminal of the knock sensor KS. Intermediate amplifiers for the signals have been omitted from the drawing for clarity, and may be used as well known.

A reference voltage is applied to the reference voltage terminal 2. The reference voltage level may vary as a function of the signal level of the background signal supplied by the knock sensor KS in operation of the ICE. It can be derived, for example, by rectification and averaging the background noise. If the knock sensing system is to include a controlled input amplifier, then the reference voltage may also be a fixed or quiescent reference voltage, at a fixed reference level.

The comparator 5 has hysteresis and has an offset-voltage circuit, that is, its output is similar to that of a Schmitt trigger, that is, it provides an output which is unambiguously either a 1-signal or a 0-signal, respectively, depending on the construction and polarization of the circuit, if no signals are applied to its inputs.

OPERATION, WITH REFERENCE TO FIG. 3

Figure 3:
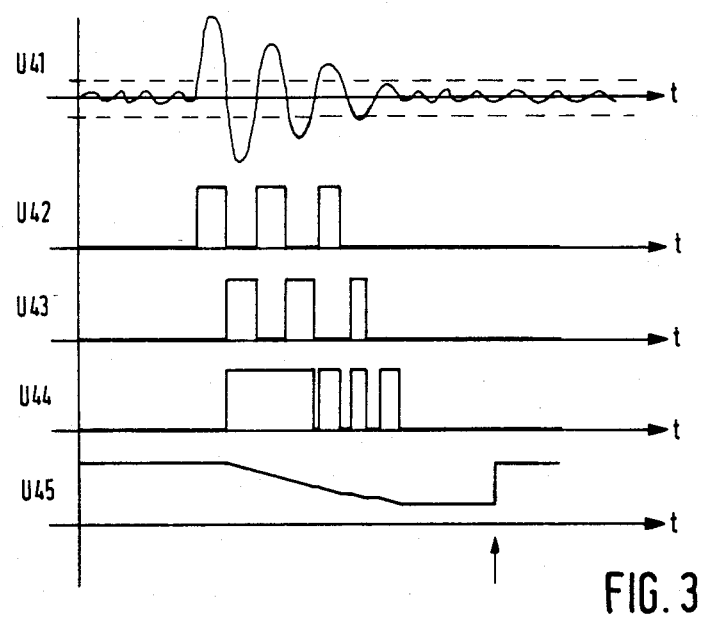
FIG. 3 is a signal diagram which will be used in connection with the explanation of the operation and of the method of the invention.

Let it be assumed that the output from the knock sensor filter 4 has signals derived from the knock sensor KS. These signals exceed the comparison level of comparator 5, so that the output of the comparator 5 will have pulses appear thereon. FIG. 3, top graph, shows the signals U41 which may be derived, for example, from the output of the knock sensor KS after filtering in the filter 4. The voltage V42, second graph of FIG. 3, shows the output from the comparator 5. The pulses or knocking impulses have an oscillating frequency which depends on the characteristics of the engine on which the knock sensor KS is installed; they depend particularly on the geometry of the combustion chamber thereof. The signals may, however, also include single statistically distributed disturbances which exceed the trigger threshold of the comparator 5. They may be single, that is, non-cyclically occurring pulses like the pulses U42 from the output of the comparator 5.

The correlation filter 10, which includes the circuit 6 providing cyclically varying output signals, typically output pulses, and the AND-gate 7, conjointly, operate such that at the output terminal 3 a pulse will appear only if the output of the circuit 6 and the output of the comparator 5, simultaneously, have a positive pulse. The output signal from the dead-time circuit 6 will be identically to the output signal from the comparator 5 delayed by the time constant T. If the output pulses U42 from the comparator 5, on the center or average frequency of a knocking signal—that is, the frequency which is to be expected—are provided, the output terminal 3 will have the same pulses appear thereat—in which, however, the first pulse is suppressed or filtered. Likewise, any whole number multiple or harmonic of this frequency will have, in an n—multiple harmonic, the first n pulses suppressed or filtered out. Frequencies which are exactly between the comb frequencies of the correlation filter are completely filtered out or suppressed. Single pulses and short pulses, likewise, are suppressed and not propagated.

The same filter function can be obtained by carrying out this digital signal processing by software in a microcomputer. As an equivalent circuit to the correlation filter, thus, the output signal of the comparator 5 is applied to an interrupt input of the microcomputer, and an interrogation, whether knocking is to be recognized or not, is carried out in temporal intervals T of the center or average frequency of knock signals to be expected. If two or more signals are applied in the temporal intervals T, the microcomputer provides a "knocking recognized" output signal, or, which is the equivalent, provides, internally, data representative of knocking recognition within the software of the system, for further processing, for example of control of the ICE to operate the ICE in a direction tending to reduce knocking, for example by slightly retarding spark ignition.

EMBODIMENT OF FIG. 2

The correlation filter 20 is a cross-correlation filter, fed by two comparators. The comparators 51, 52 are identical. The output of the knock sensing filter 4 is connected to the positive input of comparator 51 and to the negative input of comparator 52. The reference terminal 2 is connected to the negative terminal of comparator 51 and the positive terminal of comparator 52. The output of the comparators is connected to a correlation filter formed of circuits 61, 71, 62, 72, respectively. The difference between the embodiment of FIG. 2 and that of FIG. 1, basically, is this: One connection of the first AND-gate 71 and the second AND-gate 72 are cross-connected to the output of the other comparators, as is clearly seen from the diagram of FIG. 2. The outputs of the AND-gates 71, 72 are connected to an OR-gate 8. The timing or dead-time circuits 61, 62, respectively, operate at half the time constants, that is, twice the frequency of that of the timing circuit 6, FIG. 1.

OPERATION, WITH REFERENCE TO FIG. 3

The first comparator 51 forms output pulses U42, as in the embodiment of FIG. 1, if the output from the knock sensor KS exceeds the reference level in a positive direction. The second comparator 52 forms the output pulses U43 when the output from the knock sensor passes in a negative direction with respect to the reference voltage. Both comparators 51, 52 have hysteresis and have the same offset-voltage circuit. The voltages U42, U43 are shown in the second and third graphs of FIG. 3.

The time constant T/2 of the first cyclically varying circuit 61 and that of the second cyclically varying circuit 62 are half the reciprocal of the center frequency of the knock signal to be expected. At the output terminal 3, a voltage U44 will be obtained which is the composite of the voltages U42 and U43. To recognize the presence of knocking, the voltage U44 can be integrated. When the integrated level exceeds a predetermined threshold, a knock recognition signal is provided. The integration voltage U45 is shown in FIG. 3—in a negative integrating direction—starting from a fixed intergation level. The intergation is carried out for a period of time which correspond to a measuring window or measuring interval, having a time duration which depends on the operation of the crankshaft of the engine, that is, having a timing which is in synchronism with engine crankshaft operation. When the interval of the measuring window terminates, the integrator is reset, and the prior integration step cancelled. A typical window extends, for example, from a crankshaft position somewhat in advance of the most possible ignition advance position to about top-dead-center (TDC) or slightly therebeyond.

Figure 2:
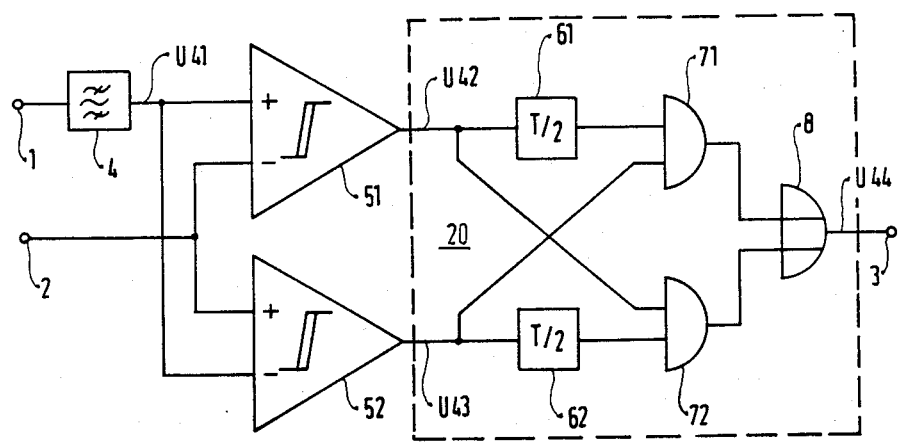
FIG. 2 is a schematic diagram illustrating another embodiment.

FIG. 2 illustrates evaluation of the signal derived from the knock sensor KS by schematically shown circuit elements. Of course, what is important is their function; this function can be equally carried out by software in a microprocessor, and the structural elements shown in FIG. 2, therefore, are to be considered in view of their function; those skilled in the art will be readily capable of suitable programming a microprocessor so that the functions shown in connection with structural elements in FIG. 2 can be realized by software as well. This conversion is obvious to those skilled in the art.

The invention shown and described in FIG. 2 as carried out in the embodiment of FIG. 2, permits contribution of only those knock signals to recognition in which, in the time T/2 the other comparator sensed that its threshold level was exceeded. Thus, the circuit will recognize only such output signals from the filter 4 as knocking signals which, in the cadence of the center or average frequency of knock signals lead to a passing of the threshold levels, and, in the course thereof, change its sign. Other signals which may be distributed in statistical sequence are not, however, recognized as knock signals. This system is particularly suitable for recognition of knocking signals within the mixture of signals derived from the sensor KS if the signal/noise ratio is extremely high.

EMBODIMENT OF FIG. 4

A correlation filter 40, similar to the filter 10 of FIG. 1, has the dead-time circuit 63 and a summing circuit 73, connected, respectively, between the filter 4 and one of the inputs of the comparator 5. The arrangement and function is similar to that of the embodiment described in connection with FIG. 1. The circuit 63 can be formed, structurally, as a "bucket brigade" circuit for the scanned and filtered output signal of the filter 4.

Various changes and modifications may be made, and features described in connection with any one of the embodiments may be used with any of the others. Specifically, the functions of the elements shown may be carried out, equally, by software controlling a microprocessor.

In one embodiment, the timing circuit 6 (FIG. 1) was: T.I.'s 74121 matched to a time constant T=0.14 msec, thus providing pulses having a pulse duration of about 0.14 msec and a repetition frequency of about 7 kHz after first having been triggered by an output from signal U42.

A suitable microprocessor is: INTEL's 8051.

We claim:

1. Method of recognizing knocking signals in a received signal derived from a knock sensor (KS) of an internal combustion engine (ICE), in which the received signal forms a mixture of background noise signals, disturbance signals, and, upon knocking operation of the engine, knocking signals, comprising, in accordance with the invention, the steps of correlating the received signal with a cyclically recurring correlation signal having an average frequency which is a function of the frequency of the knocking signal upon knocking of the engine (ICE); and providing an output recognition signal if correlation between the cyclically recurring signal and the received signal is established, and wherein the average frequency of the cyclically recurring signal corresponds at least approximately to one half of the reciprocal of the knocking frequency expected from the engine (ICE).

2. Method according to claim 1, wherein the step of providing an output recognition data signal comprises integrating a resulting output, obtained upon carrying out the correlation step.

Figure 4:
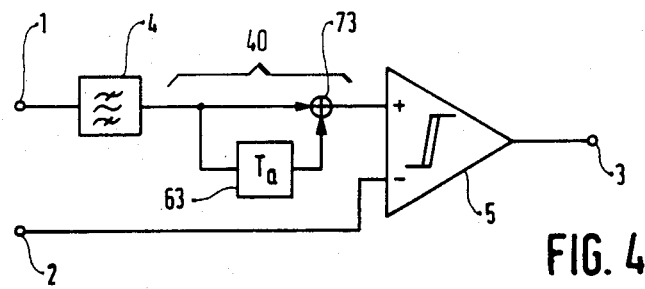
FIG. 4 illustrates yet another embodiment of the system of the present invention.

3. In combination with an internal combustion engine (ICE) subject to knocking, having a knock sensor (KS) providing sensor output signals, a system for recognizing knocking signals in the sensor output signal, derived from the sensor, which derived signal includes a mixture of background noise signals, disturbance signals, and knocking signals, if said knocking signals are present, said system comprising, in accordance with the invention, a correlation filter coupled to receive the derived signal, said correlation filter (40) including means (63) for generating a cyclically recurring correlation signal having an average frequency which is a function of the knocking signal expected from the engine (ICE) upon knocking or incipient knocking operation thereof, and means (73) coupled to receive the correlation signal and said derived signal for correlating said signals;

a filter (4) connected to receive signals from the sensor (KS) and filtering said signals with respect to a predetermined bandpass range including the frequencies of the knocking signals expected from the engine (ICE); and a comparator means (5) having a reference input terminal (2);

wherein (FIG. 4)

the correlation filter (40) is connected between the output of the bandpass filter (4) and another input of the comparator means (5), the frequency of the cyclically recurring signals being tuned to match one of the frequencies passed by the bandpass filter, said correlation filter providing an output upon correlation between the derived signal and the correlation signal and thereby indicating presence of a knocking signal.

4. In combination with an internal combustion engine (ICE) subject to knocking, having a knock sensor (KS) providing sensor output signals, a system for recognizing knocking signals in the sensor output signal, derived from the sensor, which derived signal includes a mixture of background noise signals, disturbance signals, and knocking signals, if said knocking signals are present, said system comprising, in accordance with the invention, a correlation filter coupled to receive the derived signal, said correlation filter (20) including means (61,62,71,72) for generating a cyclically recurring correlation signal having an average frequency which is a function of the knocking signal expected from the engine (ICE) upon knocking or incipient knocking operation thereof, and means (8) coupled to receive the correlation signal and said derived signal for correlating said signals; and a filter (4) connected to receive signals from the sensor (KS) and filtering said signals with respect to a predetermined bandpass range including the frequencies of the knocking signals expected from the engine (ICE), and a comparator means (5) coupled to receive the filtered signals, wherein (FIG. 2)

the comparator means (5) comprises a first comparator (51) comparing the signals derived from the bandpass filter (4) with respect to exceeding an upper threshold level; and a second comparator (52) coupled to the bandpass filter (4) and comparing the signal derived from the bandpass filter (4) upon passage below a predetermined threshold level; and wherein said correlation filter (20) comprises a cross-correlation filter, the frequency of the cyclically recurring signals being tuned to match one of the frequencies being passed by said bandpass filter (4).

5. System according to claim 4, wherein the crosscorrelation filter (20) comprises a first cyclically recurring signal generating means (61) and a second cyclically recurring signal generating means (62);

a first AND-gate (71), and a second AND-gate (72), the outputs of the first and second AND-gates being connected to an OR-funtion gate (8);

the output of the first comparator (51) and of the first cyclically recurring signal generating means being connected to the input of the second AND-gate (72), and the output of the second comparator (52) and the second cyclically recurring signal generating means (62) being connected to an input of the first AND-gate (71), the output of the first cyclically recurring signal generating means (61) being connected to another input of the first AND-gate (71), and the output of the second cyclically recurring signal generating means (62) being connected to another input of the second AND-gate (72).

6. System according to claim 5, wherein the time constants of the first and second signal generating means correspond to the reciprocal of twice the average or center frequency of the knocking signal expected from the engine.

7. In combination with an internal combustion engine (ICE) subject to knocking, having a knock sensor (KS) providing sensor output signals, a system for recognizing knocking signals in the sensor output signal, derived from the sensor, which derived signal includes a mixture of background noise signals, disturbance signals, and knocking signals, if said knocking signals are present, said system comprising, in accordance with the invention, a correlation filter coupled to receive the derived signal, said correlation filter (10) including means (6) for generating a cyclically recurring correlation signal having an average frequency which is a function of the knocking signal expected from the engine (ICE) upon knocking or incipient knocking operation thereof, and means (7) coupled to receive the correlation signal and said derived signal for correlating said signals;

a filter (4) connected to receive signals from the sensor (KS) and filtering said signals with respect to a predetermined bandpass range including the frequencies of the knocking signals expected from the engine (ICE), and comparator means (5) comparing signals derived from said knock sensor with a reference, wherein (FIG. 1) the comparator means (5) includes hysteresis.

8. System according to claim 7, wherein the comparator means provides an offset voltage circuit.

9. System according to claim 7, wherein the signals derived from the bandpass filter (4) are connected to the correlation filter (10) for correlating said signals with the cyclically recurring correlation signals.

10. System according to claim 9, wherein the comparator means provides an offset voltage circuit.

11. System according to claim 7, wherein the correlation filter comprises a microprocessor, and the cyclically recurring signal generating means are coupled to an interrogation terminal of the microprocessor to interrogate a signal state within the microprocessor based on the derived signal at said average frequency which is a function of the knocking signal expected from the engine upon knocking operation thereof.

* * * * *